Patented July 4, 1950

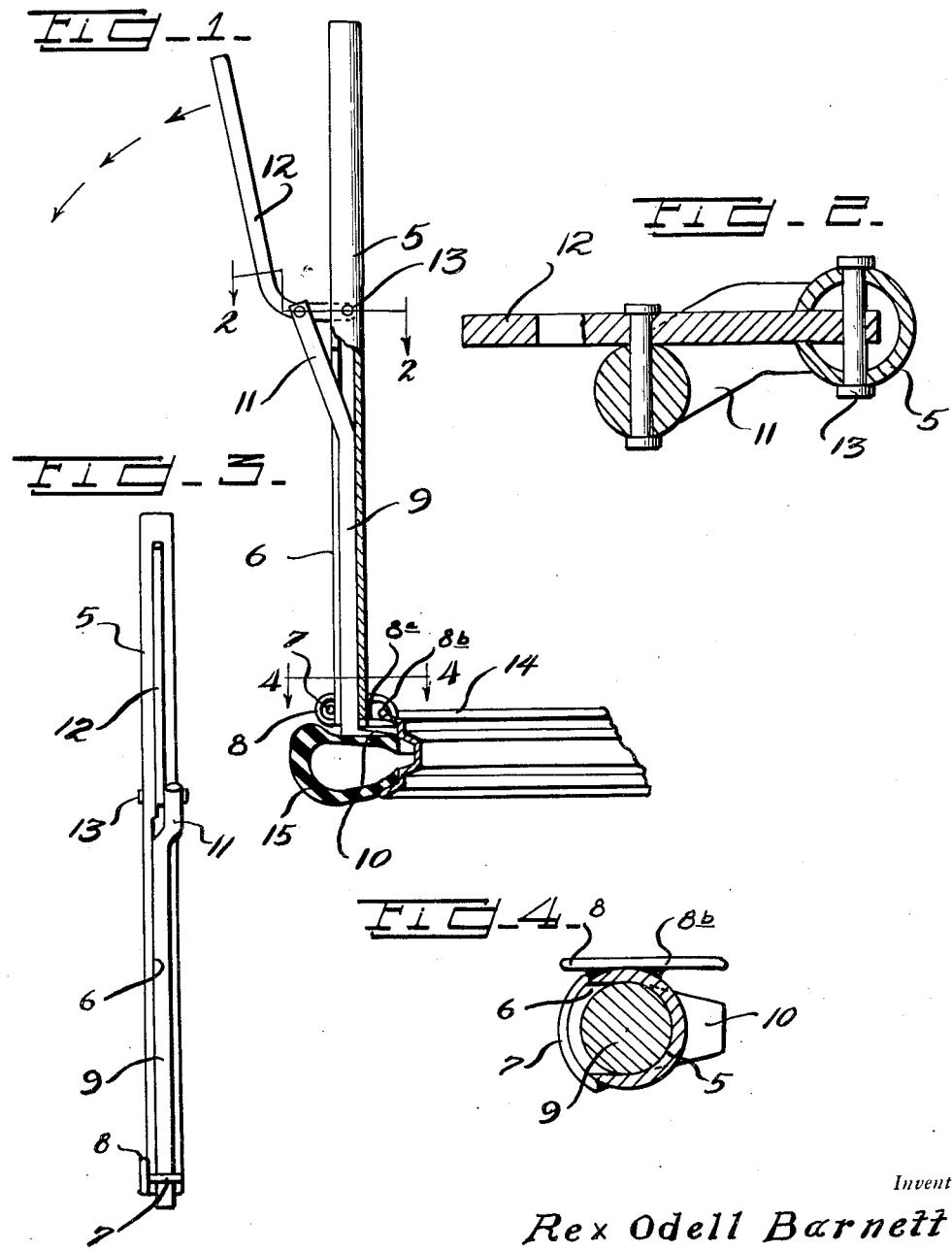

2,513,707

UNITED STATES PATENT OFFICE 2,513,707

TIRE REMOVING TOOL

Rex Odell Barnett, Heber Springs, Ark.

Application August 21, 1946, Serial No. 691,986

1 Claim. (Cl. 157—1.17)

The present invention relates to new and useful improvements in tire removing tools and more particularly to a tool of this character adapted for freeing the beading of a pneumatic tire from a drop center rim to facilitate removal of the tire from the rim.

An important object of the present invention is to provide a manually operated plunger having a foot for engaging the upper side wall of a tire adjacent the beading thereof whereby a downward pressure exerted on the plunger will compress the side walls of the tire to free the beading thereof from the rim.

A further object of the invention is to provide a tool of this character of substantially lightweight construction for easy handling and manipulation thereof and which at the same time is strong and durable, efficient and reliable in use and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a vertical sectional view of the tool shown partly in elevation.

Figure 2 is a transverse sectional view taken on a line 2—2 of Figure 1.

Figure 3 is a front elevation view, and

Figure 4 is a transverse sectional view taken on a line 4—4 of Figure 1.

Referring now to the drawing in detail wherein for the purpose of illustration I have disclosed a preferred embodiment of the invention. The numeral 5 designates a tubular post formed with a longitudinally extending slot 6 in its lower portion, the lower end of the slot being closed by a bridge piece 7 extending across the slot. A resilient clip 8 has a lower horizontal portion 8a welded to one side of the post 5 and an upper portion 8b free of the post and curved downwardly toward the lower portion and spaced slightly therefrom.

A plunger 9 is slidably mounted in the lower portion of the post 5, the lower end of the plunger extending below the post and formed with a foot portion 10 extending horizontally at one side thereof.

The upper end of the plunger 9 projects laterally outwardly of the slot 6 in an upwardly inclined direction as indicated at 11 and is pivoted at its upper end to the lower portion of an upwardly curved handle 12 which has its lower portion pivoted to the post 5 as indicated at 13. The inclined upper portion 11 of the plunger 9 is offset toward one side as indicated in Figure 2 of the drawing to position the same at one side of the handle 12.

In the operation of the device, the clip 8 is engageable with the edge of a rim 14 while the foot 10 at the lower end of the plunger 9 bears against the upper side wall of a tire 15 adjacent the beading thereof. A downward force exerted on the handle 12 will move the plunger 9 downwardly whereby to compress the upper walls of the tire and free the beading thereof from the rim 14. The tool is moved along the upper wall of the tire until the beading thereof has been completely freed to thus facilitate removal of the tire from the rim.

In view of the foregoing description taken in conjunction with the accompanying drawings it is believed that a clear understanding of the construction, operation and advantages of the device will be quite apparent to those skilled in the art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

I claim:

A tire removing tool comprising an upstanding tubular post, a horizontally extending resilient clip at the lower end of the post adapted for engaging the flange of a rim, a manually operated plunger slidably mounted in the post for engaging the upper wall of a tire to compress the same upon the downward movement of the plunger, a foot secured to the lower end of the plunger adapted for insertion under the edge of the rim for engaging the bead of the tire to free the bead from the rim, said clip being substantially C-shaped and having a lower leg straight and fixed to the lower end of said post and opening in a direction in which the foot of the lower end of the plunger extends thereby adapting said clip to straddle the rim flange and lock itself thereon in response to the foot pressing the wall of the tire and as the foot of said plunger is inserted between the rim flange and the tire bead, said post having a longitudinal slot, a curved extension on said plunger passed through said slot, a crank shaped handle pivoted to said post at a point spaced from said slot, and said extension being pivotally attached to said handle.

REX ODELL BARNETT.

REFERENCES CITED

The following references are of record in the file of this patent:

UNITED STATES PATENTS

| Number | Name | Date |
|---|---|---|
| 1,233,012 | Ashbaugh | July 10, 1917 |
| 1,452,596 | De Fernelmont | Apr. 24, 1923 |
| 1,519,558 | Snider | Dec. 16, 1924 |
| 2,319,155 | Passanante et al | May 11, 1943 |
| 2,367,638 | McCulloch | Jan. 16, 1945 |